A. N. CAMPBELL 2,678,546

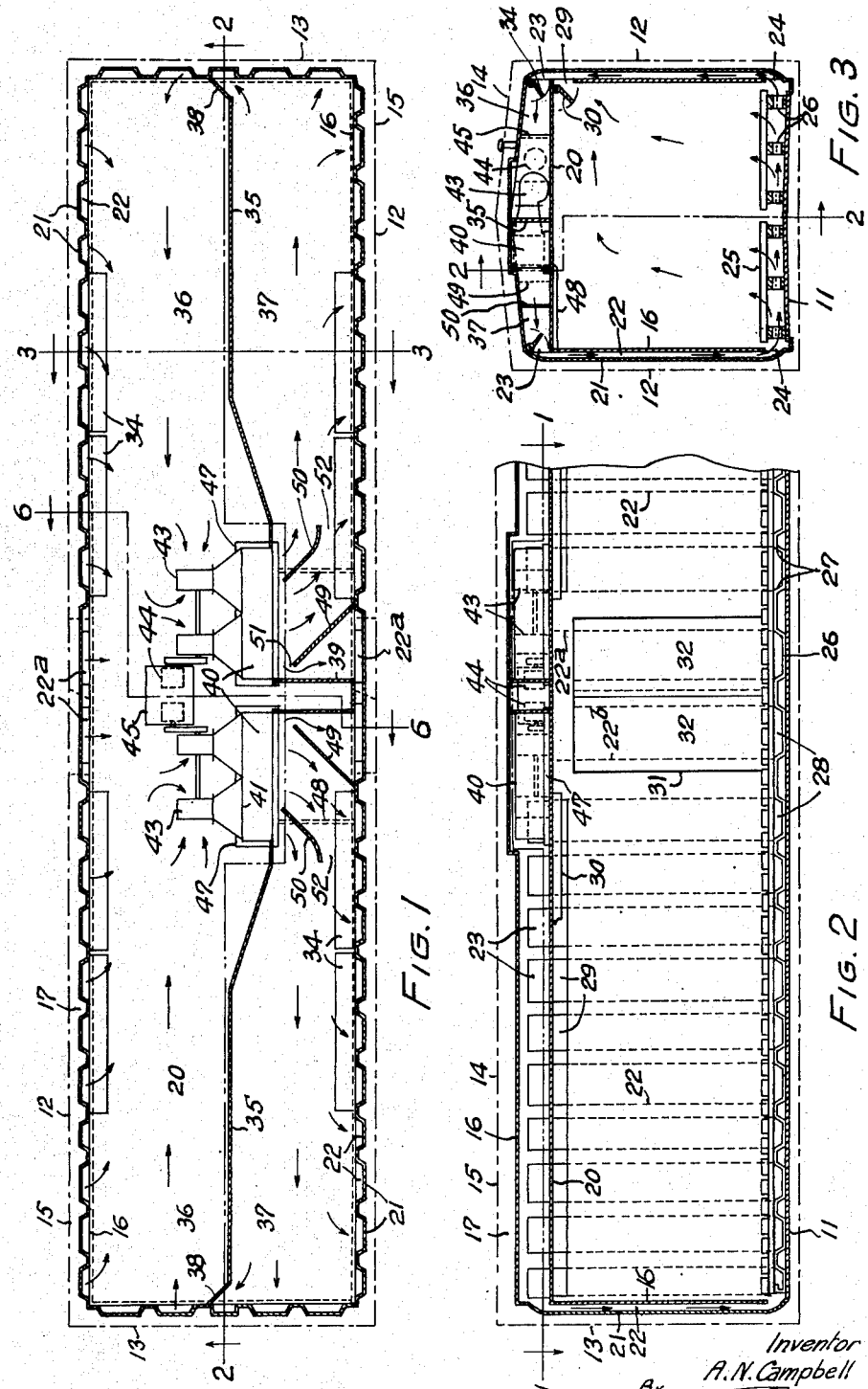
May 18, 1954 — A. N. CAMPBELL — 2,678,546
METHOD OF AND MEANS FOR REGULATING TEMPERATURE IN TRANSPORT VEHICLES
Filed Oct. 22, 1951 — 2 Sheets-Sheet 1
Inventor
A. N. Campbell May 18, 1954

METHOD OF AND MEANS FOR REGULATING
TEMPERATURE IN TRANSPORT VEHICLES

Filed Oct. 22, 1951

Inventor
A. N. Campbell
By
Attorney

Patented May 18, 1954

2,678,546

UNITED STATES PATENT OFFICE 2,678,546

METHOD OF AND MEANS FOR REGULATING TEMPERATURE IN TRANSPORT VEHICLES

Allan N. Campbell, Montreal, Quebec, Canada

Application October 22, 1951, Serial No. 252,545

21 Claims. (Cl. 62—117)

This invention relates to improvements in temperature regulated transport vehicles, such as refrigerator cars, and to a method of regulating temperature in such vehicles, and the primary object of the invention is to provide for establishment of a current of temperature regulated air substantially completely enveloping the load space in the vehicle, and affording a more efficient temperature regulation of air within the vehicle than has been possible heretofore. A further object is to provide a method of and means for temperature regulation within a vehicle body, by either cooling or heating as circumstances require, that will maintain a temperature safe for the load within the vehicle and substantially uniform in all parts thereof and for long periods of time, irrespective of changes in external temperature. A still further object is to provide a self-contained means for and method of precooling a refrigerated vehicle. Another object is to provide means and method for taking advantage of the superiority of mechanical refrigeration over water-ice and salt refrigeration to a greater extent than has been done heretofore. An additional object is to provide temperature regulating means for vehicles which does not encroach on the load space within the vehicle. Various other objects and the advantages of the invention may be ascertained from the following description and the accompanying drawings.

For simplicity of explanation, the invention will be described in its application to a railway refrigerator car but it will be understood it is not so limited and that it may be applied to road and other vehicles.

Broadly speaking, the invention consists, as to method, in establishing a current of temperature regulated air flowing downwardly in the walls of one transverse half of a vehicle body, laterally of the body beneath the load space therein, and upwardly in the walls of the other transverse half of the body and both transversely and longitudinally of the body, immediately under the roof thereof; and consists, as to apparatus, in the provision of separate plenum chambers in the roof of a vehicle, each extending from end to end of the vehicle, said chambers communicating with the upper ends of vertical air flues formed in the thickness of the vehicle side and end walls, the lower ends of said flues on one side of the vehicle communicating through transverse air passages beneath the load space in the vehicle with the lower ends of the flues in the other side of the vehicle, and in the provision of mechanical air cooling means, electrical air heating means and mechanical air circulating means, all located immediately under the roof of the vehicle approximately midway between the vehicle ends and approximately midway between the vehicle sides, said means being adapted to draw air from one plenum chamber and force it into the other plenum chamber.

In greater detail, the invention consists in the features and combinations of features herein disclosed, together with all such modifications thereof and substitutions of equivalents therefor as are within the scope of the appended claims.

In the accompanying drawings which illustrate one embodiment of the invention in its application to a railway refrigerator car, but to the details of which the invention is not limited:

Fig. 1 is a horizontal sectional view of a car at the line 1—1 of Fig. 2, diagrammatically illustrating the plenum chambers, air flues and air temperature regulating and air circulating means.

Fig. 2 is a diagrammatic longitudinal vertical sectional view of a car at the lines 2—2 of Figs. 1 and 3.

Fig. 3 is a diagrammatic cross-sectional view of a car at the line 3—3 of Fig. 1.

Figure 4:
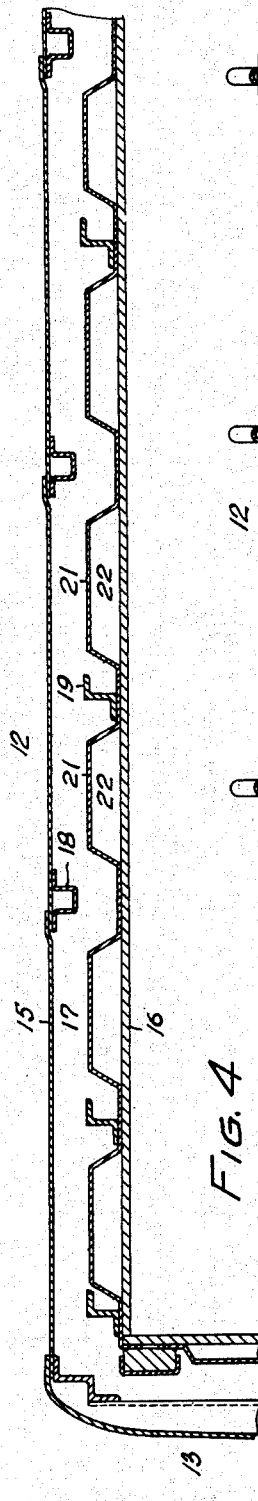
Fig. 4 is a fragmentary horizontal sectional view, on an enlarged scale as compared with previous figures, taken at approximately the level of the line 1—1 of Fig. 2 illustrating the relation of the flues to the car wall.
Figure 5:
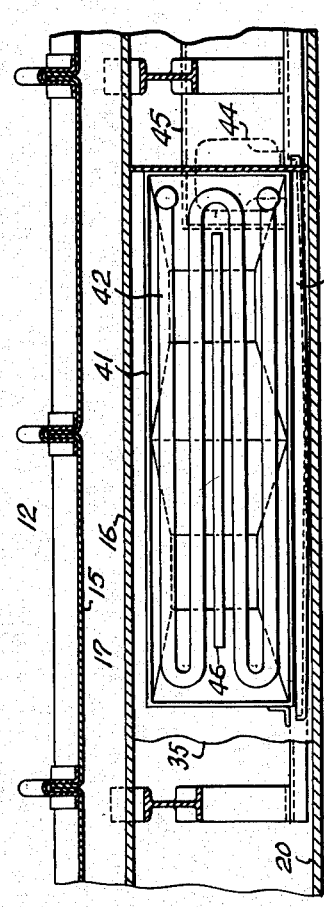
Fig. 5 is a fragmentary longitudinal vertical sectional view, on an enlarged scale, at approximately the mid-part of the line 2—2 of Fig. 1, showing an elevation of the discharge side of one of the air temperature regulating means, as seen in Fig. 2.
Figure 6:
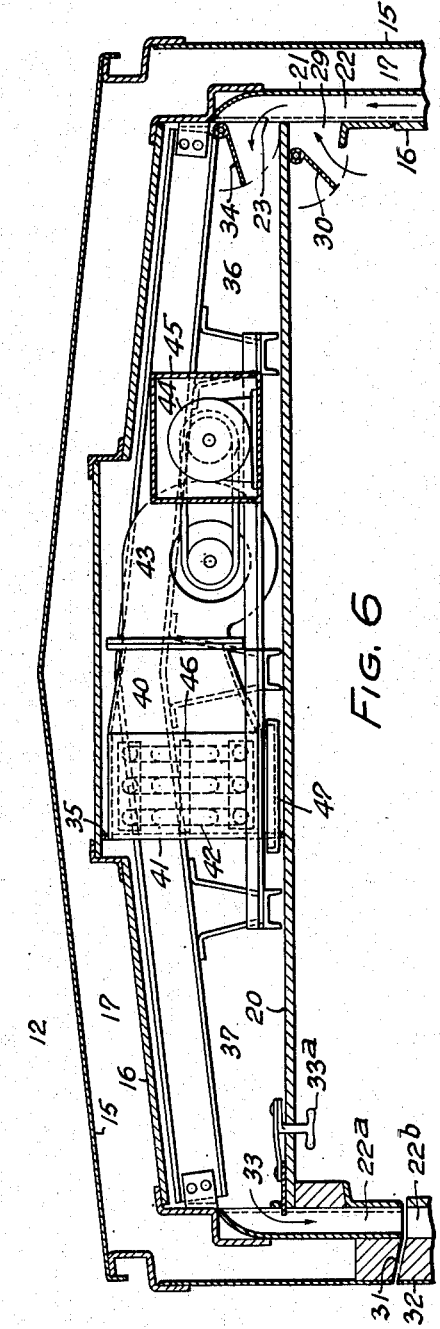
Fig. 6 is a vertical cross-sectional view, on an enlarged scale, of the upper part of a car body, at approximately the line 6—6 of Fig. 1.

Referring more particularly to the drawings, 11 designates the floor, 12 the side walls, 13 the end walls and 14 the roof of a refrigerator car body, each of which body elements includes an outer shell indicated at 15 and an inner shell or lining 16 spaced from the outer shell so as to form an insulating space 17 between the shells, in which the frame members 18 and 19 of the outer and inner shells, respectively, are disposed.

A ceiling 20 is provided a short distance below the roof lining and extends from end to end and side to side of the car so as to completely isolate the space between it and the roof lining from the load space below it.

A series of shallow pans 21 are disposed in the insulating spaces 17 of the side and end walls, between the frame members thereof, and extend from the roof lining to the floor lining, the pans being disposed with their concave surfaces facing the wall linings and their edges in close contact with the wall linings. These pans and the wall linings combine to form flues 22 extending from floor to roof outside the wall linings. Ports 23 are provided through the wall linings in the space between the ceiling and the roof lining to communicate this space with the upper ends of the flues. Similar ports 24 are provided through the wall linings immediately above the floor lining and below the level of the usual floor racks 25 to communicate the lower ends of the flues with the space between the floor lining and the floor racks.

Members 26 extending longitudinally of the car underlie the stringers of the floor racks and are formed with upwardly projecting portions 27 spaced along the length thereof and supportingly engaging the stringers of the floor racks. The spaces 28 between the projections 27 form passages enabling air to flow from side to side of the car under the floor racks. Preferably, the spaces 28 of the several members 26 are in alignment across the car and in alignment with the ports 24 so as to provide unobstructed passages across the car from the flues at one side to those at the other side. Conveniently, the members 26 may be metal bars bent to zig-zag form, as shown, or provided with transverse corrugations more closely spaced than the projections 27.

Additional ports 29 are provided through the lining of one side wall of the car, immediately below the ceiling, to communicate the load space of the car with the flues at that side of the car. Dampers 30 are hingedly mounted in position to cover the ports 29 and may be provided with any suitable means, not shown, for releasably holding them in any desired position.

The car is provided with the usual doorways 31 fitted with doors 32. The flues above the doorways, designated 22ª, open at their lower ends through the lintels of the doorways. Vertical flues 22ᵇ are provided in the doors to register with the flues 22ª when the doors are closed and these flues 22ᵇ communicate at their lower ends, through openings in the doorway sills (not shown) with the air space between the floor lining and the floor racks. Near their upper ends, the flues 22ª are provided with dampers 33 having operating means 33ª located conveniently to the doorways, whereby the flues 22ª may be closed when the doors are open.

If desired a series of independently adjustable dampers 34 may be provided between the center and each end of the car, on one or both sides thereof, to selectively adjust the effective sizes of the ports 23.

A partition 35 is provided in the space between the ceiling 20 and the roof lining and extends from end to end of the car approximately midway between the sides and from the ceiling to the roof lining. This partition divides the space above the ceiling into two plenum chambers 36 and 37, each extending the full length of the car and communicating with the upper ends of the flues 22. The end portions 38 of the partition may be diverted from the general plane thereof so as to bring the central flues of the car ends into communication with the plenum chamber 37. In the mid-portion of the car the partition 35 is offset somewhat from its general plane so as to narrow the chamber 37. Midway between the ends of the car a transverse partition 39 extends across the chamber 37, from the partition 35 to the side wall of the car, so as to divide the chamber 37 into two parts.

The evaporator of a mechanical refrigerating unit designated as a whole by the numeral 40, is mounted in the chamber 36, midway between the ends thereof, and is illustrated as divided into two sections disposed, respectively, on opposite sides of the cross partition 39. Each section of the evaporator comprises a casing 41 set into the partition 35 and opening into the chamber 37, and a refrigerant expansion element 42 within the casing. The expansion element may be of any well known or other type suitable for the purpose, such as spaced hollow plates or the spaced pipe coils illustrated. Each casing 41 is connected at its side remote from the chamber 37 with one or more blowers 43 arranged to draw air from the chamber 36 and driven by electric motors 44 mounted in a housing 45 forming an air tight separation from the chamber 36. The housing may be vented through the car roof. It will thus be seen that the sole direct communication between the chambers 36 and 37 is through the blowers and the evaporator casings.

Each evaporator section has associated with it an electric resistance heating means 46 for defrosting the evaporator and an underlying drip pan 47 to catch liquid resulting from such defrosting. A drain pipe 48 leads from each pan 47 into the top of an adjacent flue 22.

Deflecting plates 49 and 50, extending from the ceiling to the roof lining, are provided in the constricted portion of the chamber 37, on each side of the cross partition 39 and are disposed at angles of approximately 45° to the car side and inclining from the evaporator toward the car ends, to deflect air emerging from the evaporator toward the car ends. The plates 49 extend from near the junction of the evaporator casing with the cross partition 39 to the side wall at points slightly beyond the flues 22ª and provide only narrow passages 51 to admit air from the evaporator to the flues 22ª. The other deflecting plates 50 extend approximately parallel with the first plates 49 from points near the outer ends of the evaporator, toward the car side and ends. The free end portions of these plates 50 may be curved from their angular relation to the car side into parallelism therewith and terminate approximately midway between the partition 35 and the adjacent car side. These plates 49 and 50, in conjunction with the side wall of the car, form choked passages 52 leading from the major portions of the evaporator discharge openings to the car side and directed toward the car ends.

In the operation of the structure just described, the blowers 43 draw air up through the flues 22 in the side and end walls of one transverse half of the car and through the plenum chamber 36, from the ends of the car toward the transverse center, and force the air through the evaporator, with heat regulating effect, and into the plenum chamber 37. In the chamber 37 the air is distributed by the deflecting plates 49 and 50 to produce a substantially uniform flow to all flues which communicate with the chamber 37, that is, all the flues 22 and 22ª in the side and end walls of the other transverse half of the car.

The arrangement of the deflecting plates 49 and 50 provides that the major portion of air leaving the evaporator flows between these plates and is thereby directed along the car side, toward the ends thereof and in close proximity to the ports 23 leading to the flues 22; while a minor portion flowing through the restricted openings 51 goes to the flues 22ª over the doors and through the door flues 22ᵇ; and another minor portion flows over the end facing surfaces of the plates 50 and is deflected away from the ports 23 but toward the car ends and spreads through that part of the chamber 37 between the partition 35 and the current leaving the passages 52. The restricted outlets of the choked passages 52 cause the velocity of the major portion of the air to be increased so that the air streams persist to the ends of the car and the air is distributed approximately uniformly to all the flues 22 which communicate with the plenum passage 37.

Air which enters flues 22 from the chamber 37 descends through them and then flows across the car, under the floor racks, and through the ports 24 into the lower ends of the flues 22 in the other transverse half of the cars and rises through these flues into the chamber 36 by reason of the suction of the blowers. It will thus be seen that a circulation of air is created flowing mainly transversely of the car and substantially completely enveloping the load space, but isolated therefrom. It is only in the plenum chambers 36 and 37 that there is any flow longitudinally of the car and it will be noted that even here there is transverse flow from one side of the car to the blowers and evaporator and from them to the other side of the car.

If desired, the dampers 34 may be adjusted to reduce the effective size of the ports 23 progressively from the ends of the car toward the center, thereby to supplement the air flow equalizing effect of the deflecting plates.

From the foregoing it will be seen that when a car is being cooled, there is established a descending flow of cooled air substantially uniformly throughout the side and end walls of one transverse half of the car and an ascending flow of slightly less cool air substantially uniformly throughout the side and end walls of the other transverse half of the car. The capacity of the evaporator and of the blowers should be such that, with the outer shell 12 at a temperature of 175° F., the temperature of air returning to the blowers is not more than 5° F. higher than the temperature of air leaving the evaporator.

If the load in the car is dense, for example, closely packed cases, substantially none of the air flowing across the floor will rise through the floor racks but if the load is not dense, for example, fruit or vegetables in crates, some of the air flowing across the floor may rise through the load space. This air finds its way to the ports 29 and flows through them into the upper ends of the flues and into the plenum chamber 36 to rejoin the main circulation. Any such short circuiting of air may be regulated as desired, or even prevented, by suitably adjusting the dampers 30.

It is a feature of this invention that it is particularly adaptable to precooling a car during the loading thereof. To effect such precooling, the dampers 32 over the open doorway are closed so that there is no loss of cooled air through the flues 22ª if the open door is on the discharge side of the blowers and no intake of warm air if the open door is on the suction side of the blowers. Little if any cooled air will be lost through the floor racks since air flowing across the floor is cooler and heavier than the outside air and will hug the floor and tend to follow the established channel by reason of the suction of the blowers. Also, because of the heavier cool air flowing under the floor racks, little if any warm air will be drawn through the floor racks and into the circulation.

In extremely cold weather, when it is necessary to protect the load in the car from freezing, the cooling may be discontinued and the defrosting means operated for such periods of time as are necessary to counteract the external temperature. The blows 43 will then force a circulation of warmed air around the car, between the outer and inner shells thereof, in the manner already described. The stopping and starting of the cooling and the heating operations may be manually controlled but are preferably under thermostat control so as to automatically maintain the temperature within a range suitable for the load.

It will be noted that the motors 44 are separated from the plenum chambers by an air tight housing and that they are thus isolated from the air circulating around or through the loading space so that the load is protected against any possibility of absorbing motor odours or heat, which may escape through the roof vent of the housing.

Having thus described my invention, I claim:

1. A refrigerated transport vehicle comprising a body including a floor, side and end walls and a roof enclosing a load space in combination with the cooling element of a mechanical refrigerating unit, said element being located close under the roof and approximately midway between the ends of said vehicle; and means for establishing a current of air from said air cooling element flowing exclusively downwardly in the side and end walls of one transverse half of the vehicle, across the floor beneath the load space, and exclusively upwardly in the side and end walls of the other transverse half of the vehicle, returning to said cooling element.

2. A refrigerated transport vehicle comprising a body including a floor, side and end walls and a roof enclosing a load space in combination with the cooling element of a mechanical refrigerating unit, said element being located close under the roof and approximately midway between the ends of said vehicle; and means including a pair of roof chambers each extending from end to end of the vehicle for establishing a current of air flowing from said cooling element toward the ends of the car, along one side thereof and above and isolated from the load space, downwardly in the side and end walls of one transverse half of the vehicle, across the floor beneath the load space, upwardly in the side and end walls of the other transverse half of the vehicle, and from the ends and side of the vehicle, above and isolated from the load space, to said cooling element.

3. A refrigerated transport vehicle according to claim 2, in which said means for establishing a current of air includes blowers arranged to force air from one of said chambers to the other and in cooling contact with said cooling element.

4. A refrigerated transport vehicle comprising a thermally insulated body enclosing a load space; a ceiling in the body spaced a short distance below the body roof; a wall extending from the ceiling to the roof and from end to end of the body; substantially vertical flues in the body sides and ends communicating with the space above said ceiling; transverse air passages across the body floor, beneath the load space, communicating the flues on one side of the longitudinal center of the body with the flues on the other side of the longitudinal center of the body; a passage through said wall and the cooling element of a mechanical refrigerating unit disposed in said wall passage.

5. A refrigerated transport vehicle comprising a thermally insulated body enclosing a load space; a ceiling in the body spaced a short distance below the body roof and extending from end to end and from side to side of the body; a wall extending from end to end of the body, at approximately the longitudinal center line of the body, and from the ceiling to the body roof and dividing the space above the ceiling into two chambers, each extending from end to end of the body; substantially vertical flues in the body sides and ends, communicating at their upper ends with said chambers; transverse air passages above the body floor and beneath the load space communicating the flues on one side of the longitudinal center of the body with the flues on the other side thereof; a communicating passage between said chambers, located approximately midway between the ends of the body; the cooling element of a mechanical refrigerating unit disposed in said passage between said chambers; and blower means to draw air from one said chamber and force it through said passage in cooling contact with said cooling element and into the other said chamber.

6. A refrigerated transport vehicle comprising a thermally insulated body enclosing a load space; a ceiling in the body spaced a short distance below the body roof and extending from end to end and side to side of the body; a wall extending from end to end of the body, at approximately the longitudinal center line of the body, and from the ceiling to the body roof and dividing the space above the ceiling into a suction chamber and a pressure chamber, each extending from end to end of the body and from said wall to a side of the body; substantially vertical suction flues and pressure flues in the body sides and ends, communicating at their upper ends with said suction and pressure chambers, respectively; transverse air passages above the body floor and beneath said load space, communicating the lower ends of the pressure flues with the lower ends of the suction flues; a communicating passage between said suction chamber and said pressure chamber, disposed approximately midway between the ends of the body; the cooling element of a mechanical refrigerating unit disposed in said passage; and blower means to draw air up in said suction flues and through said suction passage from the ends toward the center of the body and discharge said air through said communicating passage, in cooling contact with said cooling element, into said pressure chamber and into said pressure flues.

7. Structure according to claim 6 in which the blower means delivers air into the pressure chamber in a direction transverse of the body, in combination with means in the path of air delivered by the blower means adapted to direct the air toward the ends of the vehicle.

8. Structure according to claim 6 in which the longitudinal wall separating the suction chamber from the pressure chamber is offset in an intermediate portion of its length to narrow the pressure chamber, in combination with air deflecting plates in said narrowed portion of the pressure chamber, in the path of discharge of said blower means, said plates extending from the ceiling to the roof of the body, on opposite sides of the transverse center of the body, and being disposed in vertical planes inclined to the vertical plane of the body side, the plates on one side of the transverse center of the body being inclined oppositely to the plates on the other side of said transverse center.

9. Structure according to claim 6 in which the blower means discharges transversely of the body, including pluralities of air deflecting plates disposed in the path of air discharged from said blower means and inclined to said path, the inclination of one plurality of plates being opposite to that of the other plurality of plates and the inclinations being such as to direct air toward the ends of the vehicle.

10. Structure according to claim 6 including a plurality of air deflecting plates disposed in the path of air leaving said blower means and arranged to divide air leaving the blower means into different unequal streams and to direct said streams, each to a different zone of the pressure chamber.

11. Structure according to claim 6 including series of independently adjustable dampers between said chambers and the flues related thereto.

12. Structure according to claim 6 including pairs of air deflecting plates disposed in the path of air leaving the blower means and arranged to divide said air into streams, each pair of plates, in conjunction with the adjacent body side, forming a choked passage adapted to increase the velocity of air flowing between the plates and to direct said air of increased velocity in a stream along the side of the body, in proximity to the upper ends of the pressure flues.

13. Structure according to claim 6 in which the vehicle body is provided with doorways in the sides thereof, intermediate the body ends, and in which certain of the pressure flues open through the tops of said doorways; including a pair of deflecting plates in the pressure chamber extending from near the outlet of said communicating passage to the body side wall, said plates being closely spaced at their inner ends and diverging toward the body side wall, the outer ends of said plates being spaced sufficiently to span the pressure flues over the doorway; a second pair of deflecting plates, each one of which is substantially parallel with a plate of the first pair and disposed between it and the body end and extends from adjacent said communicating passage, at a point somewhat inwardly of the end thereof, toward the body side wall, the free end of each of said second plates terminating at a distance from the side wall which is less than the distance between the first and second plates, perpendicularly thereof, whereby choked passages between the plates are formed, adapted to increase the velocity of air flowing between the plates and to direct it in streams flowing along the body side toward the body ends; said second plates having their outer end portions curved substantially to parallelism with the body side thereby to direct air flowing over their surfaces remote from the first plates, toward the body ends in streams between the said first mentioned streams and the said longitudinal wall.

14. Structure according to claim 6 including ports in the body side, immediately under the ceiling, communicating the load space of the body with the upper ends of the suction flues; and adjustable dampers controlling said ports.

15. Structure according to claim 6 including an electric resistance heating means within said communicating passage in defrosting relation to said cooling element, whereby air circulated by said blower means may be heated.

16. Structure according to claim 6 including electric motor means in said suction chamber operatively connected to said blower means; and a housing surrounding said motor means and forming an air tight separation of the motor means from said chambers and the air circulating therein.

17. Structure according to claim 6 including a pair of substantially vertical deflecting plates in the pressure chamber extending from near the outlet of said communicating passage toward the adjacent body side wall and diverging toward said side wall; a second pair of substantially vertical deflecting plates, each of which is substantially parallel with a plate of the first pair and disposed between it and the adjacent body end, the inner ends of said second plates being spaced from the adjacent ends of the outlet of said communicating passage, whereby air may flow from the passage on each side of each said second plate; the air flow passages between the inner ends of said first and second plates being each greater than the air flow passage between the inner ends of said first plates; said second plates at least being in part at least curved toward the body ends, thereby to direct air flowing over their surfaces remote from the first plates, toward the body ends.

18. Structure according to claim 6 in which the cooling element is formed in two parts and the blower means in two parts, one for each part of the cooling element; in combination with a set of substantially vertical deflecting plates associated with each part of the cooling means and extending from the outlet of said passage toward the adjacent body side, the plates of one set diverging from those of the other set.

19. A method of regulating the temperature within a transport vehicle body which comprises adjusting the temperature of a stream of air at a zone located at the top of the vehicle, midway between the ends thereof; and forcing said temperature adjusted air exclusively downwards at the side and ends of one transverse half of the vehicle body, outside the load space thereof, then transversely across the body under the load space thereof, and then drawing said air exclusively upwardly at the side and ends of the other transverse half of the vehicle body, outside the load space thereof and returning said air to said temperature adjusting zone for readjustment of the temperature thereof and for recirculation as aforesaid.

20. A method of regulating the temperature within a transport vehicle having a floor, side and end walls and a roof enclosing a load space, which method comprises adjusting the temperature of a stream of air at a zone located midway between the ends of the body and between the load space and the roof and isolated from the load space; forcing the temperature adjusted air from said zone toward the ends of the body, above the load space, and exclusively downwardly at the side and end walls throughout one transverse half of the body, with isolation from the load space; then transversely of the body, beneath the load space; drawing said air exclusively upwardly at the side and end walls throughout the other transverse half of the body; and finally drawing said air over the load space, with isolation therefrom, from the ends of the body back to said temperature adjusting zone.

21. A method of regulating the temperature within a transport vehicle body having a floor, side and end walls and a roof enclosing a load space, which method comprises adjusting the temperature of a stream of air at a zone located midway between the ends of the body and between the roof and the load space and isolated from the load space; distributing the temperature adjusted air above the load space, with isolation therefrom, substantially uniformly between said zone and the body ends in one transverse half of the body; forcing said distributed air exclusively downwardly at the side and end walls throughout one transverse half of the body; then transversely of the body, beneath the load space; drawing said air exclusively upwardly at the side and end walls throughout the other transverse half of the body; collecting said updrawn air above the load space, with isolation therefrom; and returning the collected air from the ends and sides to said zone.

References Cited in the file of this patent

UNITED STATES PATENTS

| Number | Name | Date |
| --- | --- | --- |
| 896,313 | Moore | Aug. 18, 1908 |
| 2,266,238 | Newton | Dec. 16, 1941 |
| 2,331,002 | Small | Oct. 5, 1943 |
| 2,553,471 | Protzeller | May 15, 1951 |
| 2,586,893 | Weatling | Feb. 26, 1952 |
| 2,591,178 | McAdam | Apr. 1, 1952 |
| 2,619,803 | Doering | Dec. 2, 1952 |